March 17, 1942. W. C. McCOY 2,276,502
INFLATION VALVE
Filed May 5, 1939
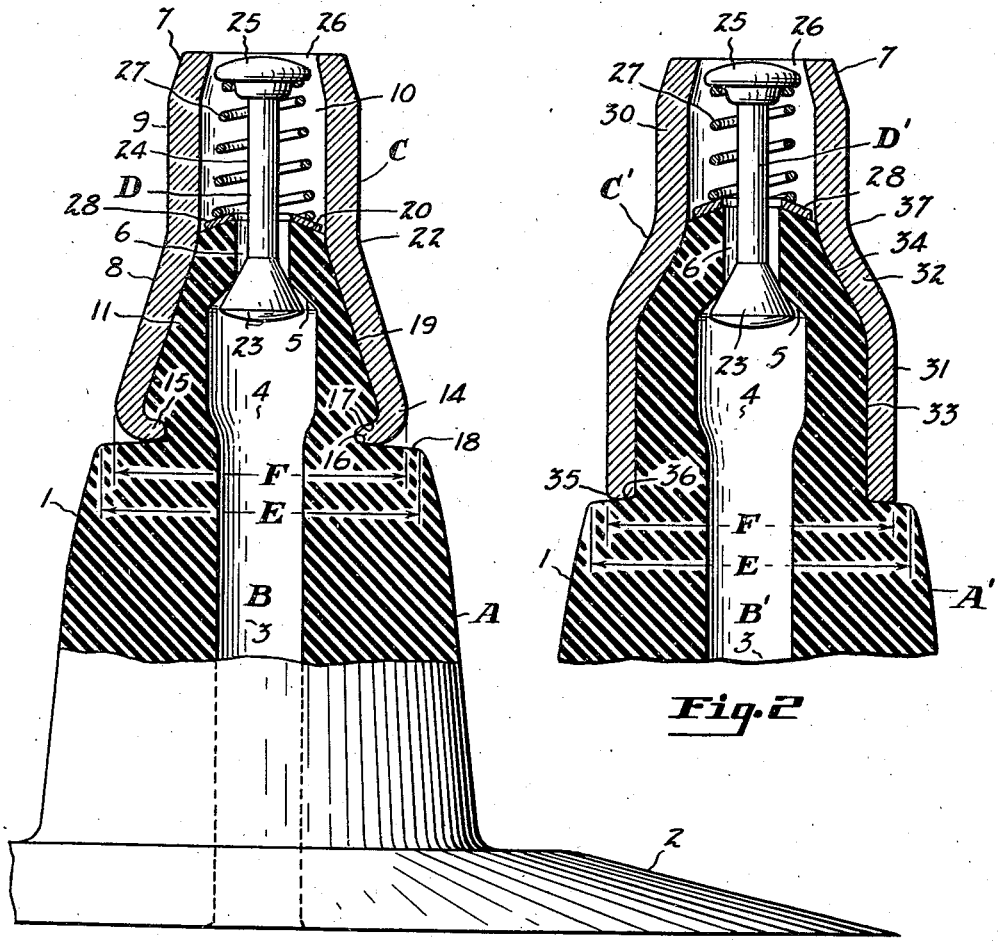
Fig. 1
Fig. 2
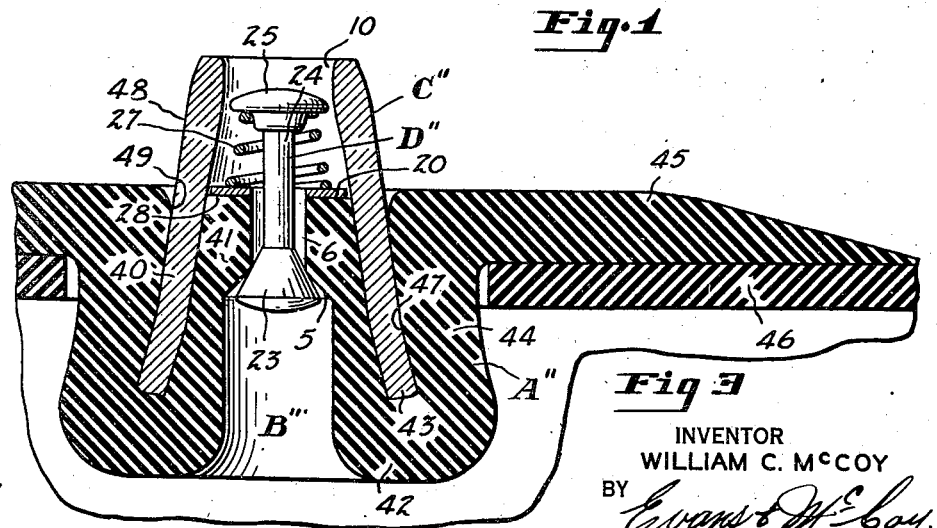
Fig. 3
INVENTOR
WILLIAM C. McCOY
BY Evans & McCoy
ATTORNEYS Patented Mar. 17, 1942

2,276,502

UNITED STATES PATENT OFFICE 2,276,502

INFLATION VALVE

William C. McCoy, Shaker Heights, Ohio, assignor to The General Tire & Rubber Company, Akron, Ohio, a corporation of Ohio Application May 5, 1939, Serial No. 271,840

6 Claims. (Cl. 277—42)

This invention relates to valves and more particularly to molded rubber valves of the character used for inflating pneumatic devices.

At the present time the wheels for automotive vehicles employ pneumatic tires inflated by rubber air bags or inner tubes which have valve stems extending through the rims of the wheels. In the event of puncture or blow-out, causing deflation of the tire, the valve stem may be pulled through the aperture therefor in the wheel rim, subjecting both the valve stem and inner tube to considerable strain. Various valve stem and wheel constructions have been resorted to for the purpose of reducing such strain and the resultant injury to either the valve, inner tube, or both. One construction has been found quite successful and comprises a valve which has a tubular rubber body portion and a radial attaching flap integral with the body. The flexibility of the body permits yielding of the same when it is drawn through the rim aperture so as to avoid injury to the valve and inner tube. An object of the present invention is, therefore, to improve rubber bodied valves so as to provide the same with rigid means for the attachment thereto of an air chuck for the purpose of inflating the article to which the valve is attached, the construction being such as to resist separation of the rigid means from the rubber body of the valve in case the valve is drawn through a wheel rim aperture.

Another object is to provide a rubber bodied valve having an integral rubber valve seat with improved non-yielding means for both reinforcing the valve seat against distension and attaching an air chuck to the valve.

Another object is to provide a rubber bodied valve which has secured thereon at one end a rigid tubular element which is so attached to the body of the valve that separation of the rubber of the body from the rigid element is strongly resisted even under conditions of extreme distortion of the valve.

A further object is to provide a rubber bodied valve of generally improved construction which is relatively simple in design and construction and inexpensive to manufacture. Other objects and advantages will become apparent from the following detailed description of suitable embodiments of the invention made in connection with the accompanying drawing, in which:

Figure 1 is an enlarged elevational view partly in section and with parts removed of a valve showing my invention;

Fig. 2 is a fragmentary longitudinal sectional view illustrating a modification of the invention; and Fig. 3 is a fragmentary longitudinal section of still another valve embodying the invention showing the same attached to an air bag.

Referring now to the drawing by letters and numerals of reference which indicate like parts throughout the several views, the invention will first be described in connection with the embodiment thereof shown in Fig. 1. A tubular body, indicated generally by the letter A, is formed of a suitable resilient rubber composition by a process of molding or the like well known in the art. The body may be of any suitable length, its dimension usually being determined by the requirements of the particular application in which the valve is to be used. The body is preferably of circular section or substantially so, as shown, although it may be of square, hexagonal, or other section if desired. At the base end of the body A is formed a radially extending attaching flap 2 which is preferably integral with the body A and may be circular or oval in plan form. Extending longitudinally or axially through the center of the body A and attaching flap 2 is an inflating passage B which has a portion 3 in the main part of the body A, toward and through the flap 2, and is also formed with an increased diameter portion 5 at or toward the upper or tip end of the body. An annular conically shaped valve seat 5, which is integral with the rubber of the body A, is formed in one end of the increased diameter portion 4 of the passage. Reduced diameter portion 6 of the passage B extends from the valve seat 5 through the tip end of the body A.

Disposed about the reduced diameter tip end of the rubber body A is a tubular reinforcing element or sleeve C which is preferably formed of metal such as brass or the like, and is in axial alignment with the passage B. This tubular sleeve has a tapered or conical portion 8 which embraces a mating conical or tapered end 11 of the rubber body A at the tip end of the latter and surrounds a portion of the passage B and the rubber valve seat 5 so as to reinforce the latter against excessive distension. An outer cylindrical portion 9 of the sleeve C extends beyond the tip end of the rubber body A and serves to provide an extension portion 10 of the passage B which is disposed wholly beyond or outwardly from the tip end of the rubber body.

Large diameter attaching end 14 of the sleeve C is bent or otherwise formed to provide a radial, inwardly directed retaining flange or element 15 which seats in an annular groove 16 formed circumferentially or substantially so about the rubber body A below or toward the base end of the body A from the region of the valve seat 5 and between radial shoulders 17 and 18 of the valve body. The dimension or diameter E across the circular shoulder 18 is considerably greater than the corresponding dimension or diameter across the circular shoulder 17 and is also greater than the dimension or diameter F across the outside of the attaching end 14 of the tubular sleeve 7. Accordingly, the periphery of the shoulder 18 where the latter is merged or formed into the side wall surfaces of the body A lies outwardly or radially beyond all portions of the tubular sleeve C.

In the event that a valve of the character contemplated by the present invention is forcibly drawn through the aperture in a wheel rim, for instance if the vehicle tire inner tube to which the valve is attached should be punctured, the sides of the body A which are disposed outwardly in a radial direction beyond the corresponding or axially aligned sides of the sleeves C, prevent attaching end 14 thereof from being engaged by the edges of the aperture in the wheel rim in such manner as would, otherwise, result in the tearing of the sleeve C from the valve body A. The groove 16, in which the flange 15 is wholly embedded or substantially so, is disposed toward the base end of the body A from the enlarged portion 4 of the passage so that the metal sleeve affords some protection to the valve mechanism and the thinner walled parts of the body.

In assembling the valve, suitable cement may be first applied to surface 19 of the tapered portion 11 of the tip end of the body A after which the sleeve C is placed thereover. The flange 15 may be preformed on the sleeve C or the flange may be rolled or otherwise formed after the sleeve is in place on the tip of the valve body. The cement or other adhesion agent between the surface 19 of the valve body and the inner surface of the tapered portion 8 of the sleeve C secures the latter to the valve body as also does the interengagement of the flange 15 with the circumferential shoulder 17.

The extreme end or tip of the body A is in the form of an annular or circular shoulder 20 which surrounds the opening into the reduced diameter portion 6 of the inflating passage and is disposed adjacent bend 22 of the sleeve C where the small diameter end of the taper portion 8 of the sleeve merges into the cylindrical portion 9. Disposed within the large diameter portion 4 of the passage B is a conical valve element 23 which is adapted for circumferential engagement with the valve seat 5 to seal the passage B. Extending longitudinally through the passage B and connected to the valve element 23 is a stem 24 which is surmounted by a head 25 normally disposed in tip end opening 26 of the sleeve C. The stem 24 thus extends through the small diameter passage portion 6 and the extension passage portion 10 defined by the cylindrical portion 9 of the metal sleeve C. A helical compression spring 27 is disposed about the stem 24 in the passage extension 10 and one end thereof has circumferential or interlocking engagement with the head 25. The opposite end of the spring 27 seats on a circular washer or bearing element 28 which is disposed flatwise against the tip end shoulder 20 of the body A. Desirably the washer 28 may be conical, as shown, and the end 20 of the body A may be similarly shaped so as to mate therewith. The spring 27 normally urges the valve element assembly, which includes the element 23, stem 24, and head 25, in an axial direction toward the tip end opening 26 of the device so as to normally urge or hold the valve element 23 in passage sealing engagement with the valve seat 5.

In the embodiment of the invention illustrated in Fig. 2, the tubular sleeve C' has a cylindrical tip end portion 30 and a cylindrical portion 31 at the attaching end thereof which is of greater diameter than the cylindrical portion 30 at the tip end. Between the two cylindrical portions is intervening conical or taper portion 32. The sleeve is disposed about a reduced diameter portion 33 of the body A' which is embraced by the large diameter cylindrical portion 31 of the sleeve and a conical or taper portion 34 at the tip end of the body A' which is embraced by the taper portion 32 of the sleeve.

End 35 of the large diameter portion 31 of the sleeve has circumferential seating engagement against a peripheral radially directed shoulder 36 formed about the body A' at the end of the reduced diameter portion 33, and spaced toward the base (not shown) of the body A' from the valve seat 5 and increased diameter portion 4 of the passage B'. The dimension or diameter E across the main part of the body A' at the shoulder 36 is materially greater than the outside dimension or diameter F across the attaching end of the sleeve so that the shoulder 36 prevents the end 35 of the sleeve from being engaged by the portion of a wheel rim which surrounds the valve stem opening, thus protecting the tubular sleeve against dislodgement should the inner tube to which the device is attached be punctured so that the valve is drawn inwardly through the rim opening.

A suitable adhesion agent, such as rubber cement, is applied to the reduced diameter and taper portions 33 and 34 respectively of the body A' prior to the placing therearound of the tubular sleeve C', so that the latter will be firmly and adhesively secured in place. While the attaching end 35 of the sleeve, shown in Fig. 2, is not as deeply nor as fully embedded in the rubber of the body A' as prevails in valves of the character shown in Fig. 1, it is substantially embedded in the rubber of the body and the protruding shoulder 36 which extends beyond the peripheral outline of the large diameter portion 31 of the sleeve prevents the end of the latter from being engaged and dislodged in normal use. It is to be noted that the valve seat 5 is disposed substantially inwardly of the tapered portion 32 of the tubular metal sleeve so as to be circumferentially reinforced thereby against excessive radial distension. Also, the circular washer element 28 is disposed adjacent bend 37 in the sleeve where the tapered portion 32 thereof merges into the reduced or small diameter cylindrical portion 30.

Valves of the character contemplated by the present invention may be used in devices other than inner tubes of pneumatic tires such, for example, as in connection with athletic equipment like footballs, basketballs, and other inflatable articles. In applications of this character it is desirable that the valve be disposed partially or wholly within the article to be inflated so that the latter presents a relatively smooth outside surface devoid of objectionably protruding valves.

In Fig. 3 is illustrated a modification of the invention which is applicable to uses wherein it is desired to have the valve disposed partially within the article to be inflated. In this construction the tubular sleeve C'' has a conical or tapered attaching portion 40 which embraces a similarly shaped tip end portion 41 of the body A'' in which is formed the inflating passage B and the integral valve seat 5. Thus the tubular sleeve C'' circumferentially embraces the portion of the body A'' in which is formed the annular valve seat so as to reinforce the latter from excessive distension.

The body A'' is folded back upon itself in the region indicated at 42 and around end 43 of the attaching portion 40 of the sleeve. Thus the attaching portion of the sleeve is in turn circumferentially embraced by a portion 44 of the body "A." The body portion 44 is circular in extent and at the end thereof opposite the bend 42 is formed with a radially extending attaching flap 45 which may be adhesively or otherwise secured to rubber bag or panel 46 of the article to be inflated through the valve. Thus the attaching portion 40 of the metal tube or sleeve C'' is substantially embedded in the body A'', in effect being disposed in a tapered or conical groove 47 which is annular in extent and surrounds the passage B'' and the valve seat 5. The tapered character of the groove 47 serves to retain the tubular element C'' in place, since to withdraw the same would require distension of shoulder portions 49 of the groove which are substantially in the plane of the attaching flap 45 and thus reinforced against distension. If desired, the surfaces of the groove 47 may be coated with a suitable adhesion agent, such as rubber cement, prior to the insertion therein of the metal tube C'' so that the latter may be more positively secured in place.

Projecting beyond the tip end shoulder 20 of the body A'' is a tapered portion 48 of the metal sleeve C'' which corresponds to the cylindrical tip portions 9 and 30 previously described, and serves to define the extension passage of the portion 10 in which is disposed the head 25 and stem 24 of the valve element assembly D''. The circular washer 28 surrounds the opening into the reduced diameter passage portion 6 and is disposed substantially in the plane of the outside surface of the attaching flap 45.

Valves embodying the present invention are peculiarly adapted to receive an air chuck of the character currently in use since the protruding tip portions 9, 30, and 48 of the metal sleeves provide a rigid member for interengagement with the air chuck, and are not subject to collapse. Additionally, the substantial embedding of the ends of the attaching portions of the metal sleeves in the rubber bodies of the valves minimizes the likelihood of the metal becoming free or loose from the rubber, thus assuring a longer life to the valve by preventing dislodgment and loss of the tubular metal sleeve.

In the manufacture of valves embodying my invention, the rubber parts are molded with no metal elements embodied in them, the metal parts being assembled with the rubber parts after all of the elements are separately formed. The valve unit D may be formed with the valve element 23, the stem 24, and the head 25 all in one piece. The valve unit D is assembled with the spring 27 and valve head 25 is then inserted through the passageway 6 before the sleeve C is applied. Air pressure may be applied to the air passage in the rubber body portion by any suitable means acting from the base of the rubber body to facilitate assembly of the valve unit D with the rubber body portion before the metal inflating sleeve is applied to the rubber body portion. The seating washer 28 may be dispensed with if desired.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details disclosed.

What I claim is:

1. A valve structure comprising a resilient and deformable body having a passage extending longitudinally therethrough, said body being laterally substantially unsupported for a portion of its length to permit bending thereof, a valve seat in the passage and integral with the body, a tubular metal sleeve embracing one end of the body in the region of the valve seat to reinforce the latter against distension, one end of the sleeve being embedded in the deformable body and the other end of the sleeve being extended beyond said end of the deformable body to provide an extension of the passage, a valve body in the passage, a stem having connection with the valve body and extending longitudinally through the passage and beyond said end of the body and into said extension, and resilient means in said passage extension and having connection with the valve stem to hold the valve body in passage sealing engagement with the valve seat.

2. A valve structure comprising a resilient and deformable body having a passage extending longitudinally therethrough, said body being laterally substantially unsupported for a portion of its length to permit bending thereof, a valve seat in the passage and integral with the body, a tubular metal sleeve embracing one end of the body in the region of the valve seat to reinforce the latter against distension, one end of said sleeve having an inturned portion embedded within the deformable body and the other end of the sleeve being extended beyond the extreme end of the deformable body to provide an extension of the passage, a valve body in the passage, a stem having connection with the valve body and extending longitudinally through the passage and beyond the extreme end of the deformable body into said extension, and resilient means in said passage extension and having connection with the valve stem to hold the valve body in passage sealing engagement with the valve seat.

3. A valve structure comprising a resilient and deformable body having a passage extending longitudinally therethrough, said body being laterally substantially unsupported for a portion of its length to permit bending thereof, a valve seat in the passage and integral with the body, a tubular metal sleeve embracing the body in the region of the valve seat to reinforce the latter against distension, means defining a circumferentially extending external groove on the deformable body, one end of the sleeve having an inturned portion embedded in said groove and the other end of the sleeve being extended beyond one extreme end of the deformable body to provide an extension of the passage, a valve body in the passage, a stem having connection with the valve body and extending longitudinally through the passage and beyond the extreme end of the deformable body into said extension, and resilient means in said passage extension and having connection with the valve stem to hold the valve body in passage sealing engagement with the valve seat.

4. A valve structure comprising a resilient and deformable body having a passage extending longitudinally therethrough and an end portion of reduced cross sectional area, said body being laterally substantially unsupported for the major portion of its length to permit bending thereof, a valve seat in the passage in the reduced section end portion of the body and integral with the latter, a tubular metal sleeve shorter than the body and of generally less transverse dimension than the body disposed in embracing relation about said reduced cross sectional area end portion of the body in the region of the valve seat to reinforce the latter against distention, said sleeve extending beyond said end of the deformable body to provide an extension of the passage, a valve body in the passage, a stem having connection with the valve body and extending longitudinally through the passage beyond said end of the deformable body into said extension, and resilient means in said passage extension and having connection with the valve stem to hold the valve body in passage sealing engagement with the valve seat.

5. A valve structure comprising a resilient and deformable body having a passage extending longitudinally therethrough and an end portion of reduced cross sectional area, said body being laterally substantially unsupported for the major portion of its length to permit bending thereof, a valve seat in the passage in the reduced section end portion of the body and integral with the latter, a tubular metal sleeve shorter than the body and of generally less transverse dimension than the body disposed in embracing relation about said reduced cross sectional area end portion of the body in the region of the valve seat to reinforce the latter against distention, said sleeve extending beyond said end of the deformable body to provide an extension of the passage, a valve body in the passage, a stem having connection with the valve body and extending longitudinally through the passage beyond the extreme end of the deformable body and into said extension, a relatively hard wear-resisting element disposed in said passage extension and seated against said extreme end of the deformable body, and a spring seated on said element and having connection with the valve stem to hold the valve body in passage sealing engagement with the valve seat.

6. A valve structure comprising a resilient and deformable body of elongated character, said body being laterally substantially unsupported to permit bending thereof and having a longitudinally extending passage therethrough including a portion of increased cross sectional area spaced from the ends of the passage, a valve seat integral with the body at one end of said passage portion, a valve body in the passage, a stem having connection with the valve body and extending through the passage beyond one extreme end of the deformable body, resilient means bearing against said extreme end and having connection with the stem to draw the valve body against the seat, and a tubular sleeve embracing a portion only of the deformable body and extending beyond said extreme end to enclose the resilient means, said passage portion of increased area being disposed wholly within the embraced portion of the body.

WILLIAM C. McCOY.